April 26, 1949.              R. K. LUNEBURG                    2,468,564
              OPTICAL OBJECTIVE SYSTEM WITH SPHERICAL
                       ABERRATION CORRECTION MEANS
                          Filed Jan. 12, 1946
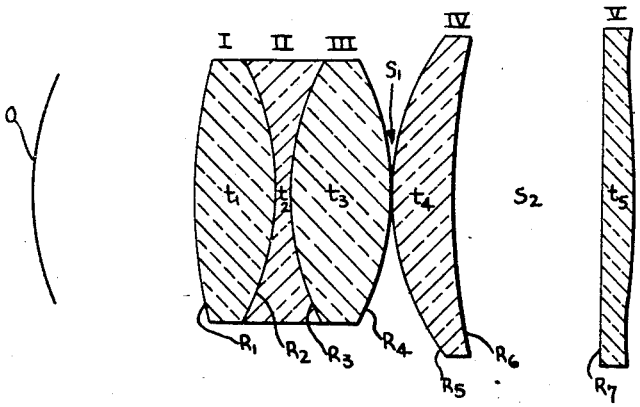
| f:1.0 NA:0.5 F=100 mm MAGNIFICATION= 8X | | | | |
|---|---|---|---|---|
| LENS | $N_D$ | $\nu$ | RADII | SPACINGS |
| I | 1.517 | 64.4 | $R_1 = +2.5\ F$ | $t_1 = .26\ F$ |
| II | 1.649 | 33.8 | $R_2 = -.94\ F$ | $t_2 = .07\ F$ |
| III | 1.517 | 64.4 | $R_3 = +1.12\ F$ | $t_3 = .34\ F$ |
|  |  |  | $R_4 = -.86\ F$ | $S_1 = 0$ |
| IV | 1.517 | 64.4 | $R_5 = +.9\ F$ |  |
|  |  |  | $R_6 = +3.5\ F$ | $t_4 = .22\ F$ |
|  |  |  |  | $S_2 = .52\ F$ |
| V | 1.517 | 64.4 | $R_7 = \infty$ | $t_5 = .09\ F$ |
                                              INVENTOR
                                         RUDOLF K. LUNEBURG
                                    BY  *Herbert C. Kimball*
                                              ATTORNEY Patented Apr. 26, 1949

2,468,564

UNITED STATES PATENT OFFICE 2,468,564

OPTICAL OBJECTIVE SYSTEM WITH SPHERICAL ABERRATION CORRECTION MEANS

Rudolf K. Luneburg, Buffalo, N. Y., assignor to American Optical Company, Southbridge, Mass., a voluntary association of Massachusetts Application January 12, 1946, Serial No. 640,801

5 Claims. (Cl. 88—57)

This invention relates to an arrangement for projecting onto a flat screen an image formed on a curved surface and more particularly to such an arrangement in a television receiver for pro-projecting from a cathode ray tube having a curved surface or plate which is concave toward the lens system, with the resulting picture free from defects due to coma, astigmatic and other aberrations.

A well known type of cathode ray tube receiver produces the primary image on a curved fluorescent plate. Because the television receiving set, if it is to be made available for wide use, must be inexpensive and relatively compact, it has not been a simple matter to provide the necessary lens system for producing on a flat screen the image which is to be viewed.

I have found that a lens system may be provided meeting the above conditions, which is remarkably free from coma and the various aberrations except spherical aberration (and this spherical aberration may also be taken care of by means of a corrector plate) by using in compact relation with the curved screen, or other curved object, a front triplet member and a rear meniscus member, both members being positive and the meniscus member being convex toward the front member. In such a combination, I prefer that the radius of curvature of the front surface of the first element of the triplet member shall be approximately three times the radius of curvature of the front surface of the meniscus member. As above suggested, the residual spherical aberration requires the use of a corrector plate having an aspheric surface.

In a preferred embodiment which is shown in the accompanying drawing, the two outer elements of the triplet member together with the meniscus member are all formed of the same glass, which is a considerable convenience.

In this drawing, the lens system is illustrated in combination with its curved object field which is shown diagrammatically, it being understood that the latter may represent a fluorescent screen of a cathode ray tube or any similarly curved object.

It is obvious that the light may be passed in the reverse direction through the lens system, thus imaging on a curved screen at the left of the triplet the plane object which is to the right of the lens system.

The following description relates to the use of a lens system embodying the invention in connection with a curved object O such as the curved fluorescent plate of a cathode ray tube, the radius of curvature of the object O being approximately 110 to 115 millimeters.

As above pointed out, a compact arrangement is provided by employing a front triplet member and a rear meniscus member. The front member is positive and for purposes of correction is formed of three elements I, II, III cemented together. The rear member, which in this particular embodiment is in touching relation with the first member, is also positive and is formed as a meniscus element IV.

The first and third elements of the triplet front member together with the meniscus member IV are formed of the same glass, while the intermediate element II of the triplet member is formed of dense flint.

This combination of a triplet front member and a meniscus rear member is remarkably free from coma and astigmatism but the system is not free from spherical aberration. This spherical aberration is removed by a corrector plate V having an aspheric surface. This plate V is placed at such a distance $S_2$ from the meniscus element IV as not to introduce coma or astigmatism.

This lens system has the following characteristics:

| f:1.0 NA:0.5 F=100 mm. Magnification=8X | | | | |
|---|---|---|---|---|
| Lens | $N_D$ | V | Radii | Spacings |
| I | 1.517 | 64.4 | $R_1=+2.5$ F | $t_1=.26F$ |
|  |  |  | $R_2=-.94F$ |  |
| II | 1.649 | 33.8 |  | $t_2=.07F$ |
|  |  |  | $R_3=+1.12F$ |  |
| III | 1.517 | 64.4 |  | $t_3+.34F$ |
|  |  |  | $R_4=-.86F$ |  |
|  |  |  |  | $s_1=0$ |
|  |  |  | $R_5=+.9$ F |  |
| IV | 1.517 | 64.4 |  | $t_4=.22F$ |
|  |  |  | $R_6=+3.5$ F |  |
|  |  |  |  | $s_2=.52F$ |
| V | 1.517 | 64.4 | $R_7=\infty$ | $t_5=.09F$ | where the Roman numerals refer to elements starting with the short conjugate or front side, $N_D$ is the index of refraction with reference to the D line of the spectrum, V is the dispersive index, $R_1$ to $R_6$ are the radii of curvature of the refractive surfaces consecutively from front to rear, the + and − signs refer respectively to surfaces convex and concave to the front, $t_1$ to $t_4$ are the axial thicknesses of the elements, $s_1$ and $s_2$ are the air space thicknesses between the front and rear members and between the rear member and the corrector plate, NA is the numerical aperture, $f$ is the aperture ratio and F is the focal length of the lens system, the contacting surfaces of the triplet member being cemented.

The use of such a combination of a positive triplet front member and a positive meniscus rear member with the meniscus member convex to the front member produces a remarkably true image upon the viewing screen. This result is accomplished without the use of expensive glasses and a convenient and compact arrangement is obtained.

Having thus described and explained my invention, I wish to point out that it is not limited to the structure shown but is of the scope of the appended claims.

I claim:

1. A high speed projection lens system having a relatively close curved object field and a relatively flat image field located at a greater distance therefrom, said object field being concave toward said lens system, said projection system comprising a positive front triplet member, a positive rearwardly concaved meniscus member adjacent said triplet member and a corrector plate rearwardly thereof and in spaced relation thereto, the combination consisting of said triplet member and said meniscus member being a system highly corrected for coma and astigmatism and uncorrected for spherical aberration, said corrector plate having an aspheric surface for substantially correcting the residual spherical aberration of said projection system.

2. A projection lens system according to claim 1 in which the radius of curvature of the front surface of the first element of said triplet member is approximately three times the radius of curvature of the front surface of said meniscus member.

3. A projection lens system according to claim 1 in which the two outer elements of said triplet member and said meniscus member are formed of the same glass.

4. A high speed projection objective lens system comprising a positive cemented triplet member at that end of the system nearer to the shorter conjugate for receiving light directly from the object to be projected, a positive rear meniscus member with both its surfaces convex to said end of the system and a corrector plate at the other end of the system, the combination consisting of said triplet member and said meniscus member being highly corrected for coma and astigmatism, and said corrector plate having an aspheric surface for substantially correcting the spherical aberration of said combination.

5. A projection lens system having a curved object field and having approximately the following specifications:

| Lens | $N_D$ | V | Radii | Thicknesses |
|---|---|---|---|---|
| I | 1.517 | 64.4 | $R_1=+2.5\ F$<br>$R_2=-.94F$ | $t_1=.26F$ |
| II | 1.649 | 33.8 | $R_2=-.94F$<br>$R_3=+1.12F$ | $t_2=.07F$ |
| III | 1.517 | 64.4 | $R_3=+1.12F$<br>$R_4=-.86F$ | $t_3=.34F$ |
| IV | 1.517 | 64.4 | $R_4=+.9\ F$<br>$R_5=+3.5\ F$ | $s=0$<br>$t_4=.22F$ | where the Roman numerals refer to elements starting with the short conjugate or front side, $N_D$ is the index of refraction with reference to the D line of the spectrum, V is the dispersive index, $R_1$ to $R_5$ are the radii of curvature of the refractive surfaces consecutively from front to rear, the $+$ and $-$ signs refer respectively to surfaces convex and concave to the front, $t_1$ to $t_4$ are the axial thicknesses of the elements, $s$ is the air space thickness between the front and rear members and F is the focal length of the lens system, the contacting surfaces of the triplet member being cemented.

RUDOLF K. LUNEBURG.

REFERENCES CITED

The following references are of record in the file of this patent:

UNITED STATES PATENTS

| Number | Name | Date |
|---|---|---|
| 2,100,291 | Lee | Nov. 23, 1937 |
| 2,146,905 | McLeod et al. | Feb. 14, 1939 |
| 2,170,979 | Straubel | Aug. 29, 1939 |
| 2,217,281 | Konig | Oct. 8, 1940 |
| 2,332,930 | Rinia | Oct. 26, 1943 |
| 2,377,268 | Rinia | May 29, 1945 |

FOREIGN PATENTS

| Number | Country | Date |
|---|---|---|
| 492,174 | Germany | Feb. 22, 1930 |
| 616,565 | Germany | July 31, 1935 |